Figure 3:
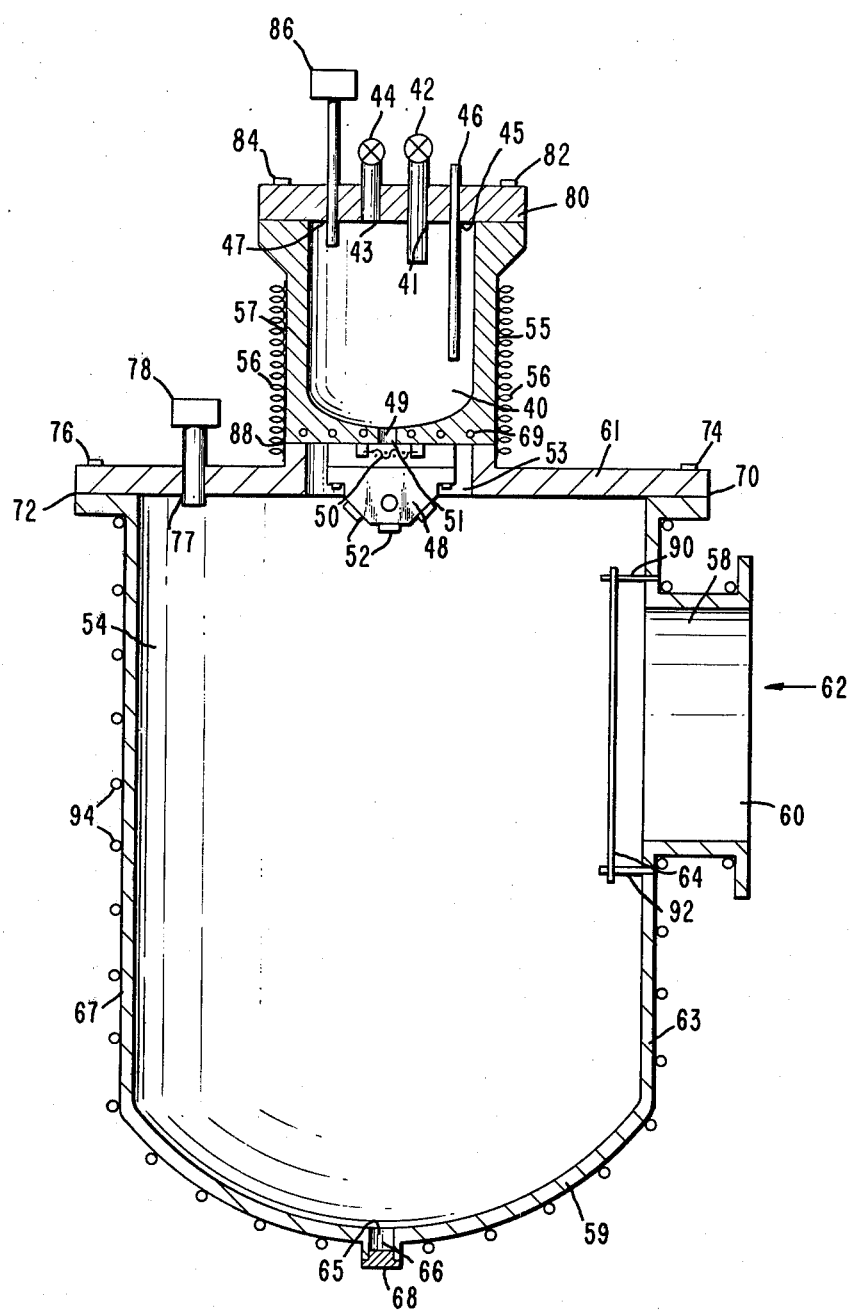

United States Patent [19]

Mastrup et al.

[11] 4,324,765
[45] Apr. 13, 1982

[54] APPARATUS FOR PUMPING GASES USING A CHEMICALLY REACTIVE AEROSOL

[75] Inventors: Frithjof N. Mastrup, Palos Verdes Peninsula; Leonard J. Marabella, Torrance, both of Calif.

[73] Assignee: Hughes Aircraft Company, Culver City, Calif.

[21] Appl. No.: 170,434

[22] Filed: Jul. 21, 1980

Related U.S. Application Data

[62] Division of Ser. No. 960,681, Nov. 13, 1978, abandoned.

[51] Int. Cl.³ .............................................. B01D 50/00
[52] U.S. Cl. .................................... 422/173; 422/163
[58] Field of Search ............... 422/163, 168, 173, 182, 422/239; 55/220

[56] References Cited

U.S. PATENT DOCUMENTS

| | | | |
|---|---|---|---|
| 323,583 | 8/1885 | Kendall | 423/532 |
| 3,885,918 | 5/1975 | Isahaya | 422/168 |
| 3,960,505 | 6/1976 | Marks | 422/168 |
| 3,966,418 | 6/1976 | Frexel et al. | 55/220 X |
| 4,213,935 | 7/1980 | Goodnight et al. | 422/182 X |

*Primary Examiner*—William A. Cuchlinski, Jr.
*Attorney, Agent, or Firm*—Mary E. Lachman; W. H. MacAllister

[57] ABSTRACT

An apparatus for pumping and removal of unwanted gases by effecting a chemical reaction between the gases and a highly reactive substance which is in the form of aerosol particles, to form a nonvolatile, solid reaction product. In one embodiment of the invention, the reactive substance is initially provided in the form of a solid; the solid is heated to liquify it; and the liquid is forced through spray nozzles under high pressure to form the desired aerosol particles, which then react with the gas to be pumped.

5 Claims, 4 Drawing Figures

Fig. 2

Fig. 1

| STEP I | PROVIDE REACTIVE SUBSTANCE IN SOLID FORM |
| STEP II | HEAT SOLID TO FORM LIQUID |
| STEP III | APPLY PRESSURIZED INERT GAS TO LIQUID TO FORM AEROSOL PARTICLES |
| STEP IV | REACT AEROSOL PARTICLES WITH SELECTED GASEOUS MATERIAL TO FORM SOLID PARTICLES |
| STEP V | REMOVE SOLID PRODUCTS |

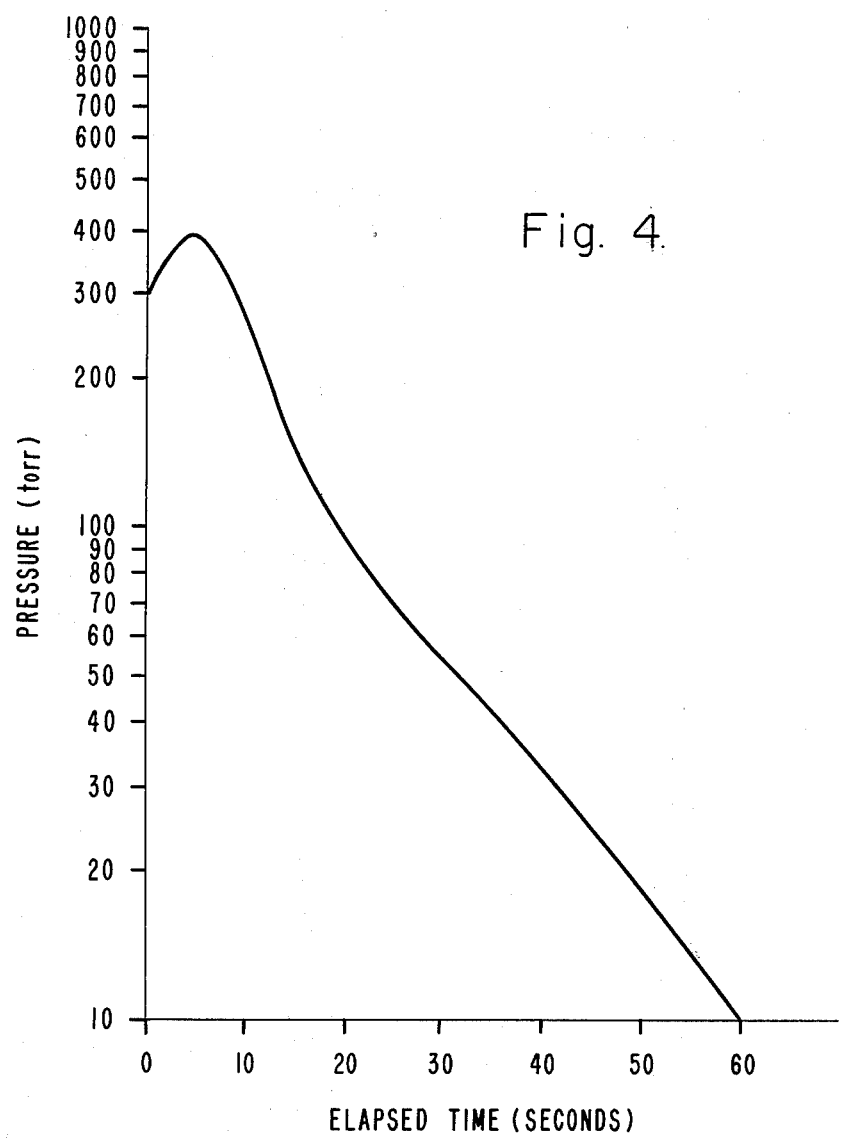

APPARATUS FOR PUMPING GASES USING A CHEMICALLY REACTIVE AEROSOL

This application is a division of application Ser. No. 960,681, filed Nov. 13, 1978, abandoned, from which continuation application Ser. No. 172,749 was filed July 28, 1980.

FIELD OF THE INVENTION

This invention relates to a pumping process and apparatus and more particularly to a pumping process which employs a chemical reaction with aerosol particles to remove unwanted gases.

BACKGROUND OF THE INVENTION

Although a variety of pumping processes have been used in the past to remove gases from a closed container, these processes are similar to each other in that they all employ some physical means to move the gases. For example, a mechanical pump mechanically displaces the gas to remove it; a diffusion or ejector pump entrains gas molecules in a heavy molecular substance such as oil or steam; a cryogenic pump condenses the gas by means of application of a low temperature; a sorbent or getter pump binds the gas on the surface of sorbent molecules; and a blow-down system provides an evacuated chamber which the gas is allowed to fill. While these and other similar pumps perform their intended function (i.e., to raise, transfer or compress fluids), they have disadvantages in some specialized applications, such as pumping a chemical laser, because of their high weight, large size, complex apparatus for implementation, and significant operaing costs. In addition, in certain applications which require a short pump operating time (e.g. 5 to 500 seconds), it is desirable to have a pump whose size scales with the operating time. Most of the pumps mentioned above do not scale with operating time and the pump size is determined solely by the required pumping rate. Furthermore, during the use of these pumps, the pumped gases must be discharged, which could present a problem if these gases are toxic or corrosive.

Such limitations make these pumps unsuitable for some airborne use and space applications. In particular, there is a need for an efficient, compact, light-weight pump which can be used with a chemical laser to remove the flowing reaction product gases and to maintain a pressure of 5 torr or less so that the lasing action can occur. These lasers are used in various applications where a high density of energy is required at a target surface, including such end-item uses as electronic countermeasures devices, target designators, weapons systems and radar systems.

There is one known process which differs from the pumps previously mentioned in that it uses a chemical reaction to remove gases. This type of pump is known as a solid-bed chemical pump and removes gases by a gas-solid chemical reaction. A reactive solid, such as calcium (Ca), is formed into pellets of high surface area. These pellets are then placed in a chamber and the gas to be removed is introduced into the chamber. A chemical reaction occurs between the calcium and the gas, a solid reaction product is formed on the surface of the Ca pellets, and thus the gas is removed. For example, if the gases to be removed are hydrogen fluoride (HF) and nitrogen ($N_2$), the bulk chemical reactions would be:

$$2Ca+2HF \rightarrow CaF_2+CaH_2$$

$$3Ca+N_2 \rightarrow Ca_3N_2$$

There are, however, several disadvantages in the solid-bed (calcium) chemical pump. The primary disadvantage is that the solid-bed Ca pump is complex and expensive both to fabricate and to operate. In addition, preparation of the Ca pellets used in this type of pump involves a costly, dangerous, and time-consuming process. Furthermore, once the pellets have been prepared, they are subject to violent explosions when carelessly exposed to air. Further difficulties encountered in the operation of a solid-bed Ca pump are that it requires a vacuum seal prior to use and it requires extensive maintenance to replace spent Ca pellets. In addition, during the use of such a pump, dangerous temperature increases can occur for extended run times (e.g., greater than 5 seconds) because of the inability of the Ca pellets to efficiently dissipate the heat generated by the chemical reaction of the gases and Ca. This problem arises because the highly porous structure of the Ca pellets is not an efficient structure for the conduction of heat. However, this pellet structure is necessary in order to have a high surface area of Ca available for chemical reaction. The more the surface area of the Ca is increased by increasing the porosity of the solid Ca, the greater the heat transport problem becomes. When the heat of reaction is not dissipated, the Ca pellets themselves attain excessive temperatures and some reaction products initially formed are decomposed by the heat (i.e., the chemical reaction is reversed), and the solid-bed Ca pump does not function. This limitation makes the solid-bed Ca pump of limited application for a chemical laser system that might require pumping for 5 to 500 seconds of continuous operation.

SUMMARY OF THE INVENTION

The general purpose of this invention is to provide a new and improved process and apparatus for pumping and removing exhaust or waste gases and which possesses most, if not all, of the advantages and functions of the above prior art pumps and related processes, while overcoming their above significant disadvantages. The present invention overcomes these disadvantages of the prior art processes related to complexity, expense, safety, ease of implementation, and heat transfer. Moreover, the present invention provides a new and improved process for pumping gases over a wide operating range and uses an apparatus of simple construction which may operate for extended periods of time as required by certain types of chemical laser systems.

The above general purpose of this invention is accomplished by providing a new and improved process for pumping selected gases by converting them into a non-volatile, solid product. More specifically, the present invention provides a new and improved pumping process in which a chemical reaction occurs between the gases to be removed and a highly reactive substance which is in the form of aerosol particles.

In order to further accomplish this purpose, we have discovered and developed a novel pumping process in which the gaseous material to be removed (or waste or exhaust gas) is brought into contact with aerosol particles of a highly reactive substance. An aerosol is used herein to mean a suspension of fine solid or liquid particles in a gas, and is discussed further by A. G. Bailey, in "The Generation and Measurement of Aerosols," *Jour-*

*nal of Materials Science,* Vol. 9, page 1344 (1974). A chemical reaction occurs between the aerosol particles and the gaseous material to form a solid non-volatile reaction product, thus removing the gaseous material. In a preferred embodiment, the highly reactive substance is provided in solid form, liquefield by heat, and then caused to flow through an aerosol-producing means.

In order to carry out our invention and its intended purpose as stated above, we have also discovered and developed a new apparatus for implementing the novel process of pumping gases by chemically reacting them with aerosol particles of a chosen reactive substance.

Accordingly, it is an object of the present invention to provide a new and improved process for removing certain unwanted gaseous materials.

Another object is to provide a new and improved process for converting certain waste or exhaust gases into solid form, thus eliminating possibly hazardous exhaust products.

A further object is to provide a new and improved pumping process which employs a chemical reaction with aerosol particles to remove unwanted gases in a direct and highly controllable manner.

Another object is to provide a process of the type described which has a wide operating range of pumping speeds and the capability of pumping at a high gas volume flow rate.

Another object is to provide a process of the type described which is capable of operating over a wide pressure range.

Still another object is to provide a process of the type described which is capable of maintaining high gas flow rates at low operating pressure.

Another object is to provide a process of the type described which can produce a vacuum for a short duration and on a pulsed basis.

Yet another object is to provide a process of the type described in which the reactants are relatively safe and easy to handle and the final reaction product is easily removed.

It is a further object of the present invention to provide a new and improved apparatus for the implementation of the process described above.

A feature of the apparatus of the present invention is that it is simple in construction and requires no moving parts.

Another feature of the apparatus described is that is is comparatively light in weight and of small size.

An additional feature of the apparatus described is that it is rugged, reliable and has reusable structural parts.

Another feature of the apparatus described is that it does not require the use of an auxiliary pump to produce an initial vacuum in order to function.

These and other objects and features of the invention will become more readily apparent in the following description of the drawings and preferred embodiments of the invention.

BRIEF DESCRIPTION OF THE DRAWINGS

FIG. 1 presents a flowchart for some of the major steps in one process embodiment of the present invention.

FIG. 2 is a schematic diagram of a simplified apparatus for implementation of the process of the present invention.

FIG. 3 is a schematic diagram of an apparatus for implementation of the process of the present invention as it was reduced to practice.

FIG. 4 is a curve showing the reduction in chamber pressure versus elapsed time using the process and apparatus of the present invention.

DESCRIPTION OF THE PREFERRED EMBODIMENTS

Referring now to FIG. 1, step I indicates that a reactive substance is provided in the form of a solid. This reactive substance may be lithium, sodium, potassium, calcium, a combination of these elements, or a similar substance which has a high chemical affinity for the gases to be removed and which generates precipitating non-volatile reaction products as a result of reaction with these gases. The reactive substance may be provided in the form of ingots, which are easy to handle. The solid reactive substance is placed in a chamber and, as indicated in step II of FIG. 1, heat is applied at a temperature sufficient to cause the solid to liquefy. In practice, heat is applied to the outside of the chamber containing the solid and the temperature of the solid is monitored with a thermocouple. Optionally, the reactive substance may be initially provided in liquid form. After the reactive substance has been liquefied, an inert gas such as argon, neon, helium, xenon or krypton pressurizes the reactive substance as indicated in step III of FIG. 1 to force the liquid through nozzles designed to cause the liquid to break up into small particles as the liquid flows through the nozzles. Thus, a spray or aerosol having particles of controlled size is generated. Next, as shown in step IV of FIG. 1, the aerosol particles of the reactive substance are brought into contact in a second chamber with the selected gaseous materials to be removed. A vigorous chemical reaction occurs between the gaseous material and the reactive aerosol, resulting in the formation of precipitating, non-volatile reaction products generating a partial vacuum in the second chamber, which provides the pumping and removal of the gaseous material from its original container. Finally, after completion of the required pumping task, as step V of FIG. 1 indicates, the solid reaction products can be removed by using an appropriate solvent to put at least some of the solids into solution and then draining the resultant solution or slurry. Optionally, the solid reaction products may be removed by using removable walls within the second chamber and then removing the walls and the adhering reaction products after completion of the pumping task.

Turning now to FIG. 2, there is shown in simplified form an apparatus for implementation of the process described in FIG. 1. A first chamber 10, or antechamber, which receives the reactive substance in solid form, is provided with the openings 11 and 13. The opening 11 in the top surface 9 of the chamber 10 receives a valve 12 which controls the influx of the inert gas 14 through pipe 21 into the chamber 10. The opening 13 in the bottom surface 8 of the chamber 10 is connected to an aerosol-producing means 16 which is also connected to a second chamber 18. The aerosol-producing means 16 may contain a valve which controls the flow rate of the reactants into the second chamber 18. This valve may be omitted, in which case the reactant flow rate is controlled by the pressure of the inert gas 14 that is applied as discussed below. The chamber 10 is also provided with the heating elements 22 on the outside surface of a portion of its vertical walls 6 and 7 and on the bottom surface 8. When heat is applied to the walls 6, 7, and 8 of the chamber 10, it is conducted to the solid reactive substance (not shown) and a liquid 24 is formed in the chamber 10. The second chamber 18, in which the reactive aerosol reacts with the gaseous material to be removed, is provided with the openings 15, 17 and 19. The opening 15 in the top surface 25 of the chamber 18 receives the aerosol-producing means 16 which is also connected to the chamber 10, as discussed above. The opening 17 in one vertical wall 26 of the chamber 18 passes the influx of the gaseous material 28 to be removed, into the chamber 18. The opening 19 in the bottom surface 27 of the chamber 18 receives a drain 30 and a plug 32 which are used to remove the solid reaction products 34 after they have been put into solution. The opening 19 and the drain 30 and plug 32 are not needed if the optional removable wall configuration is used, as discussed for FIG. 1. The chamber 18 is also provided with the cooling elements 36 on the outside surface of the vertical walls 29 and 31 and the bottom surface 27.

The apparatus of FIG. 2 is operated in accordance with the flowchart of FIG. 1. First, a reactive substance in solid form is placed in the chamber 10 of FIG. 2. The heating elements 22 adjacent the first chamber 10 are activated so that heat is applied to the reactive solid sufficient to cause it to form the liquid 24 of FIG. 2. Then, the inert gas 14 is applied under controlled pressure through the valve 12 into the first chamber 10 to force the liquid 24 through the aerosol-producing means 16 to form the aerosol particles 20 in the second chamber 18. At the same time, the gaseous material 28 to be removed is introduced through the opening 17 into the second chamber 18. A chemical reaction occurs between the aerosol particles 20 and the gaseous material introduced into the second chamber 18, and solid reaction products 34 form and settle on the interior walls and the bottom of the second chamber 18. While the chemical reaction is taking place, the cooling elements 36 are activated to remove heat from the second chamber 18. After the reaction has been completed, the first chamber 10 is separated from the second chamber 18. One method of cleaning the second chamber 18 is to add water slowly to the chamber 18 to react with the solid reaction products 34 to form a solution or a slurry, which is drained off through the drain 30 by removing the plug 32. Similarly, the first chamber 10 may be cleaned by the slow addition of water.

Directing attention now to FIG. 3, there is shown a schematic diagram of an apparatus as it was actually reduced to practice. A first chamber 40, or antechamber, which receives the reactive substance such as lithium in solid form, is constructed of stainless steel and is typically 6 inches wide and 9.5 inches high. The chamber 40 is provided with a top portion 80 which is joined to the remainder of the chamber 40 by a number of hardened steel bolts such as the bolts 82 and 84. A hollow O-ring made of metal, such as a nickel alloy, (not shown) provides a seal between the top portion 80 and the top open surface of the chamber 40. The top portion 80 of the chamber 40 is provided with the openings 41, 43, 45 and 47. The first opening 41 in the top portion 80 receives a valve 42 which controls the influx of argon, for example, under high pressure (typically 850 pounds per square inch) into the chamber 40. By controlling the pressure of the argon and thus the flow rate of the reactant through the nozzle 52, the pumping speed can be controlled. The second opening 43 in the top portion 80 receives a valve 44 which provides for relief of pressure in the chamber 40. If it is desired to terminate the flow of Li and thus the pumping process before the whole ingot of Li has been consumed, the valve 44 can be opened and the pressure in the chamber 40 relieved. Without the application of the required gas pressure, Li flow stops and the pumping process ceases. The third opening 45 in the top portion 80 receives a thermocouple 46 which is used to monitor the temperature of the contents of the chamber 40. The fourth opening 47 in the top portion 80 receives a pressure indicator 86 which is used to monitor the pressure in the chamber 40.

In addition, the chamber 40 is provided with an opening 49 in the bottom surface 88 which receives a nozzle holder 48. A stainless steel mesh filter 50 is placed across the opening 49 in the bottom surface 88 of the chamber 40 where this opening abuts the top opening 51 in the nozzle holder 48. The filter 50 removes any solid impurities which may be present in the liquid and prevents them from passing into the aerosol-producing means where they might clog the openings. The aerosol-producing means comprises the nozzle holder 48 which contains a plurality of stainless steel nozzles 52 which have openings of predetermined size for controlling the aerosol particle size. These nozzles 52 project into a second chamber 54 to be described below. At the bottom surface 88 where the nozzle holder 48 abuts the lower surface of the chamber 40, a hollow metal O-ring (not shown) is inserted to provide efficient sealing. The chamber 40 is also provided with the heating elements 56 on the outside surface of the vertical walls 55 and 57 and with heating elements (not illustrated) which are inserted in the openings 69 near the bottom surface 88 of the chamber 40. When the heating elements 56 and those inserted in the openings 69 are activated, the walls 55, 57, and 88 of the chamber 40 are heated and this heat is conducted to the contents of the chamber 40, which is the reactive substance in solid form. When a sufficiently high temperature is reached, the solid turns to liquid and forms a pool in the bottom of the chamber 40. (Although lithium liquefies at 180° C., in practice the chamber 40 is maintained at an internal temperature of 450° C. to promote the pumping reaction.)

A second chamber 54, in which the reactive aerosol reacts with the gaseous material to be removed, is constructed of stainless steel, has a curved bottom, and is typically 16 inches wide and 19 inches high. The volume of the chamber 54 must be large enough to allow the aerosol particles to remain suspended for a period of time sufficient to react with the incoming gaseous material. The bottom surface 59 of the chamber 54 as shown in FIG. 3 is curved in order to provide additional structural stability, but this curved-bottom structure is optional. The chamber 54 has an opening 53 in its top surface 61 which receives the nozzle holder 48 and thus connects with the chamber 40. An O-ring (not shown) made of Viton (a rubber substance manufactured by Parker Seals, Inglewood, California) is used to provide efficient sealing at the surfaces 70 and 72 where the chamber 40 and the chamber 54 are joined together by a number of hardened steel bolts such as bolts 74 and 76. Also, in the top surface 61 of the chamber 54 there is an opening 77 that receives a pressure indicator 78, which is used to monitor the pressure in the chamber 54.

In one vertical wall 63 of the chamber 54, there is an opening 58 typically 8 inches in diameter, with a flange 60 which provides access into the chamber 54 for the gaseous material 62 to be removed from its original container (not shown). The valve for controlling the influx of the gaseous material 62 is located external to the apparatus of FIG. 3, at the source of or container holding the gaseous material. Parallel to the opening 58 and within the chamber 54 is a gas flow deflector 64 which provides an even flow of the gaseous material 62 in the chamber 54 by preventing a straight-through flow of gas which would force the reactive aerosol particles against the walls of the chamber 54 and interfere with the ability of the particles to react. The gas flow deflector 64 is held in place by the screws 90 and 92. At the bottom surface 59 of the chamber 54, there is an opening 65 which receives a drain tube 66 with a plug or cap 68. The tube 66 is used upon completion of pumping, to remove the solid reaction products after they have been put into solution. The opening 65 in the chamber 54 and the drain tube 66 may optionally be placed on a vertical wall of the chamber 54 near the bottom surface of the chamber. Finally, the chamber 54 is provided with the cooling elements 94, for example, cooling pipes, on the outside surface of the vertical walls 63 and 67 and the bottom surface 59. When the cooling elements 94 are activated, the walls 63, 67, and 59 of the chamber 54 are cooled and, in turn, the contents of the chamber 54 are cooled. Cooling is required in order to dissipate the heat produced by the chemical reaction which occurs in the chamber 54. Example 1 provides a description of the operation of the apparatus of FIG. 3.

Turning next to FIG. 4, the data obtained upon actual reduction to practice is displayed on a semi-log plot to indicate the decrease in chamber pressure which occured as time elapsed, using the present invention. The apparatus of FIG. 3 was used to pump nitrogen gas, using a 75 liter volume initially charged with nitrogen at 350 torr at room temperature. "Pressure" in FIG. 4 refers to the pressure within the chamber 54 of FIG. 3. "Elapsed Time" in FIG. 4 refers to the duration of time for which pumping was performed. Effective pumping action over the range of 350 torr to 10 torr is indicated in FIG. 4, in which the slope of the curve is proportional to the moles per second per torr of gases pumped. Data have also been obtained to demonstrate the effective pumping of nitrogen at pressures ranging from 650 torr to less than 5 torr.

EXAMPLE 1

Using the apparatus described in FIG. 3, the present invention has actually been reduced to practice to pump nitrogen ($N_2$) gas. The apparatus of FIG. 3 was placed in a holding device which supported the apparatus by the protruding surface where the chambers 40 and 54 are joined (below the bolts such as bolts 74 and 76). An ingot of filtered, battery-grade lithium (Li), 99.8% pure, (obtained from Lithium Company of American in Bessemer City, North Carolina), was loaded into the chamber 40 of FIG. 3. The top portion 80 of the chamber 40 was removed by removing the connecting bolts as exemplified by the bolts 82 and 84 and the metal O-ring at the interface between the top portion 80 and the top open surface of the chamber 40. The Li was inserted into the chamber 40 and the metal O-ring, the top portion 80, and the connecting bolts similar to the bolts 82 and 84 were replaced. The cooling elements 94 were activated by applying a 5 gallon per minute flow of water. Heating elements which consisted of cartridge heaters were inserted in the openings 69 near the bottom surface of the chamber 40 and were activated by the application of a controlled voltage. The heating elements 56, which consisted of a band heater strapped to the chamber 40, were also activated by application of a controlled voltage, and a temperature of 450° C. was maintained in the chamber 40. After the chamber 40 had reached a stable temperature of 450° C., at which temperature the Li solid had liquefied, argon gas at a pressure of 850 pounds per square inch was applied through the valve 42 into the chamber 40. The pressurized argon forced the liquefied Li through the nozzles 52, to form a spray of aerosol particles which were introduced into the chamber 54. The nozzles used were obtained from Spraying Systems Company, Wheaton, Ill., and had an opening size at the exit of 0.016 inch. The Li flowrate per nozzle was 1.6 grams of Li per second and seven nozzles were used. At the same time as (or after) the aerosol particles were introduced into the chamber 54, the gaseous material to be removed, i.e., nitrogen, was introduced into the chamber 54 through the flange 60. The following chemical reaction is assumed to generate the observed pumping action:

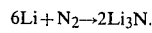

$$6Li + N_2 \rightarrow 2Li_3N.$$

The lithium nitride ($Li_3N$), indicated by its observed red color, precipitated out and settled to the bottom of the chamber 54. Gas pumping speeds of up to 0.2 moles/second of $N_2$ (5.6 grams/second of $N_2$) at 250 torr have been measured. Lithium efficiencies have been measured to be in excess of 0.5 grams of $N_2$ per second/gram of Li per second. This measured efficiency exceeds 75 percent of the theoretically possible value of 0.67 grams of $N_2$ per second/gram of Li per second, based upon the stoichiometry of the reaction. Effective pumping action has been accomplished over the pressure range from 650 torr to 5 torr of nitrogen.

To clean the apparatus after pumping was completed, the chamber 40 was separated from the chamber 54 by removing the connecting bolts such as the bolts 74 and 76. Then water was carefully and slowly added to the chamber 54. The following chemical reaction occurred:

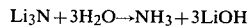

$$Li_3N + 3H_2O \rightarrow NH_3 + 3LiOH$$

The $NH_3$ dissipated as a gas and the LiOH dissolved in the excess water to form a solution which was removed from the chamber 54 by removing the plug 68 from the drain tube 66 and allowing the solution to drain into a suitable waste container. To clean the chamber 40, the top portion 80 was removed by removing the connecting bolts such as the bolts 82 and 84, and water was carefully and slowly added to the chamber 40. Any remaining Li reacted with the water as follows:

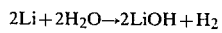

$$2Li + 2H_2O \rightarrow 2LiOH + H_2$$

The LiOH dissolved in the water and was poured out of the chamber 40. The $H_2$ escaped as a gas.

EXAMPLE 2

The present invention was also reduced to practice to provide exhaust gas pumping for a simulated hydrogen fluoride (HF) chemical laser exhaust, in a manner similar to that specified above for $N_2$.

In an HF laser, a hydrogen fluoride (HF) molecule is produced in an excited state (HF*) which produces the lasing action. The associated chemical reactions are as follows:

$$D_2 + 2F_2 \rightarrow 2DF + 2F \quad (1)$$

$$F + H_2 \rightarrow HF^* + \tfrac{1}{2}H_2 \quad (2)$$

$$HF^* \rightarrow HF + h \quad (3)$$

Thus, the waste gases from an HF laser system are: HF, DF, $H_2$ and $N_2$, the latter being used to cool the laser gases.

In practicing the present invention, using Li as the reactive substance and HF laser exhaust gases as the exhaust gases, the following chemical reactions occurred in the chamber 54 of FIG. 3:

$$HF + 2Li \rightarrow LiH + LiF$$

$$H_2 + 2Li \rightarrow 2LiH$$

$$N_2 + 6Li \rightarrow 2Li_3N$$

Using the apparatus shown in FIG. 3, except that only one nozzle was used, gas pumping speeds of 18 millimoles/second of HF laser exhaust gases (0.4 g/second of gases) were measured. Only $H_2$ and HF were used in this example and the deuterium analogs were omitted since their chemical properties are the same.

When pumping had been completed, the solid reaction products were reacted with water. The following reactions occurred:

$$LiH + H_2O \rightarrow LiOH + H_2$$

$$Li_3N + 3H_2O \rightarrow 3LiOH + NH_3$$

The LiOH dissolved in the water to form a solution; the LiF is insoluble in water but formed a slurry in the solution of LiOH; and the slurry was drained off through the tube 66 of FIG. 3. The $NH_3$ and $H_2$ escaped from the open system as gases.

The present invention has the potential to overcome many of the disadvantages of the prior art solid bed chemical pumping process previously discussed. First, the present invention is more simple and less expensive than the prior art solid bed Ca pump. The present invention can be easily implemented using the claimed apparatus which has no moving parts, consists of easily manufactured, rugged components, has reusable structural parts, and requires no permanent vacuum. In addition, there are no extensive maintenance requirements in implementing the present invention. The present invention also overcomes prior art problems relating to safety and ease of implementation. In the preferred embodiment discussed above, the present invention uses solid lithium in the form of ingots which may be obtained from a commercial supplier. In this form, the lithium presents reduced safety hazards, compared to the prior art Ca pellets and may be handled in air. Also, in practicing the present invention, the problem in conventional pumps of removing hazardous or toxic exhaust products is minimized because a solid reaction is formed. The solid reaction product which settles on the walls and the bottom of the reaction chamber can be removed by controlled reaction of water with the solids to form soluble products, which can then be drained off. With similar ease, when the lithium reactant is used up, merely cleaning the reactant reservoir and inserting a new lithium ingot makes the pump ready for use again.

In addition, a major disadvantage of the prior art process, as discussed, is the internal heat transport problem which arises from the inability of the calcium pellets to efficiently dissipate the heat of chemical reaction. By contrast, using the present invention, heat transport is accomplished more effectively than the solid bed Ca pump so that the problem of dangerous temperature increases is minimized. Heat is transported to the walls of the reaction chamber of the present invention by means of radiation, mass deposition of the aerosol onto the walls, and convection. At elevated temperatures, radiation becomes the dominant heat transfer process. Both the rate of reaction and heat transfer by radiation are proportional to the surface area of the particles. An increased reaction rate is, thus, accompanied by increased heat dissipation, so that a steady state can be achieved and temperature increases are moderated. In order to achieve increased pumping speeds in practicing the present invention, the dispersion of the aerosol may be increased to increase the particle surface area without generating an excessive temperature increase.

In addition to overcoming disadvantages of the prior art processes, the present invention has further advantages to offer not easily available in the prior art. One important feature of the present invention is that it offers a wide range of operating pressure. At fixed operating pressure and temperature, the instantaneous pumping speed per unit mass of injected aerosol material is proportional to the product of total specific aerosol area, $A_s$, and the surface chemical rate constant, $K_s$. The total specific aerosol area can be changed by changing the aerosol diameter in accordance with the following equation:

$$A_s = \frac{6}{\rho d_o} \text{ cm}^2/\text{gr}$$

where
 $A_s$ = specific aerosol area
 $\rho$ = aerosol material bulk density (gr/cm$^3$)
 $d_o$ = aerosol diameter (cm)

The diameter of the aerosol is influenced by the spray nozzle design and by adjusting the pressure of the inert gas which forces the reactive liquid through the nozzle. Thus, by changing the diameter of the aerosol material in the present invention, it is possible to effectively pump gases over a wide range of flow rates. By appropriately scaling the rate of Li flow and the dimensions of the reaction chamber, the present invention can accommodate a wide range of gas flow rates. It is estimated that flow rates of at least 10 moles/second can be pumped. In addition, if the reactant is actively cooled, the aerosol pump operating time is limited only by the amount of reactant that is stored. Hence, the operating time may vary from short pulses to continuous operation. It has further been demonstrated that the present invention can perform over a pressure range of approximately 0.01 to 1 atmosphere for operating times of up to 300 seconds.

Furthermore, the present invention has a distinct potential advantage over the majority of prior art processes by virtue of the fact that the apparatus used for its implementation is much lighter in weight and smaller than many conventional pumping apparatus. If a pump is being used in conjunction with a chemical laser, a conventional pump could be as much as 75 percent of the total weight of the system. On the other hand, the claimed apparatus of the present invention may be only 10 to 30 percent by weight of the total system. The low weight and small size of the apparatus of the present invention make it particularly suited for airborne use and space applications. Also, the present invention offers a significant advantage in applications which have a low duty cycle because the size of the pump scales with the required operating time.

The present invention is also particularly suited for application to chemical laser systems, where there is the requirement for pumping exhaust gases for short periods of time (i.e., pulsed), to produce a low pressure at a high gas flow rate. In addition, there is the advantage in using the present invention that the toxic exhaust gases HF and DF are eliminated.

Thus, the present invention not only overcomes the disadvantages of prior art processes associated with complexity, expense, safety, ease of implementation and heat transfer, but also offers the further advantages of a wide range of pumping speeds and operating pressures, light weight and small size.

While the invention has been particularly described with respect to the preferred embodiments thereof, it will be recognized by those skilled in the art that certain modifications in form and detail may be made without departing from the spirit and scope of the invention. In particular, the scope of the invention is intended to include the reaction of exhaust gases with reactive aerosol particles which may be formed by means other than those described herein. The reactive substance may be provided in liquid as well as solid form. Furthermore, in the apparatus described, the particular dimensions indicated may be varied and the position of the openings, such as those for the influx of exhaust gas and for the influx of reactive aerosol, may be varied on the surfaces shown and may be on different surfaces than those shown.

What is claimed is:

1. Apparatus for pumping certain exhaust gases from a container therefor by converting said gases into solids by chemically reacting said gases with a chosen highly reactive substance in the form of aerosol particles, and to thereby generate a partial vacuum surrounding said solids, and provide said pumping of said exhaust gases, which comprises:
   (a) a chamber having first and second openings therein;
   (b) means adjacent said first opening of said chamber for providing the influx of said exhaust gases from said container into said chamber through said first opening in said chamber,
   (c) an antechamber adjacent said second opening of said chamber, to contain said reactive substance in solid form and having first and second openings therein;
   (d) means adjacent said antechamber for heating said antechamber to raise the temperature therein sufficiently to liquefy said solid;
   (e) means associated with said first opening of said antechamber and said second opening of said chamber, for dispersing said liquefied reactive substance into said aerosol particles; and
   (f) means associated with said second opening of said antechamber for applying a chosen inert gas to said liquefied reactive substance under pressure sufficient to cause said substance to flow through said dispersing means to form said aerosol particles and to inject said aerosol particles into said chamber through said second opening in said chamber.

2. Apparatus for converting certain exhaust gases as set forth in claim 1 wherein item (e) further includes one or more nozzles through which said liquefied reactive substance is forced by said inert gas to form said aerosol particles.

3. A pump for removing a selected gas from a container therefor by converting said gas to a solid which comprises a first chamber having a first opening therein for receiving said gas and a second opening therein which is spaced from said first opening; a second, smaller chamber adjacent said second opening in said first chamber and operative to receive a chosen highly reactive solid material; means adjacent said second chamber for converting said highly reactive solid into a liquid; and means between said first and second chambers and aligned with said second opening in said first chamber for injecting said liquid into said first chamber in the form of an aerosol spray where said aerosol spray reacts with said gas to form a solid reaction product which deposits on the inner surfaces of said first chamber and to generate a partial vacuum in said first chamber and thereby provide for said removing of said selected gas from said container.

4. The pump defined in claim 3 wherein said injecting means includes a plurality of nozzles between said first and second chambers and providing a plurality of liquid flow paths between said first and second chambers; and said converting means includes a heater adjacent said second chamber for heating said highly reactive solid to a predetermined elevated temperature, whereby a selected inert gas may be passed into said second chamber under pressure to force said liquid through said plurality of flow paths between said chambers and convert said liquid to said aerosol spray in said second chamber and having a controlled particle diameter.

5. A pump for removing a selected gas from a container therefor by converting said gas to a solid, which comprises a first chamber having a first opening therein for receiving said gas and a second opening therein which is spaced from said first opening; a second, smaller chamber adjacent said second opening in said first chamber and operative to receive a chosen highly reactive liquid material; and means between said first and second chambers and aligned with said second opening in said first chamber for injecting said liquid into said first chamber in the form of an aerosol spray where said aerosol spray reacts with said gas to form a solid reaction product which deposits on the inner surfaces of said first chamber and to generate a partial vacuum in said first chamber and thereby provide for said removing of said selected gas from said container.

* * * * *